(12) United States Patent
Chang et al.

(10) Patent No.: US 8,868,322 B2
(45) Date of Patent: Oct. 21, 2014

(54) AIR TRAFFIC COMPLEXITY REDUCTION SYSTEM UTILIZING MULTIVARIABLE MODELS

(75) Inventors: Jessica Chang, Rockville, MD (US); Pratik Jha, Herndon, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 735 days.

(21) Appl. No.: 12/588,841

(22) Filed: Oct. 29, 2009

(65) Prior Publication Data

US 2010/0106396 A1 Apr. 29, 2010

Related U.S. Application Data

(60) Provisional application No. 61/193,112, filed on Oct. 29, 2008.

(51) Int. Cl.
*G06F 19/00* (2011.01)
*G06G 7/76* (2006.01)

(52) U.S. Cl.
USPC ............................................. 701/120; 701/8

(58) Field of Classification Search
USPC ........... 701/3, 5, 7, 8, 10, 200, 201, 202, 300, 701/4, 6, 120, 408; 342/33, 26 R, 34; 244/164; 73/178 R, 17 R; 703/8
See application file for complete search history.

(56) References Cited

U.S. PATENT DOCUMENTS

| | | | |
|---|---|---|---|
| 7,248,949 B2 * | 7/2007 | Love et al. ........................ | 701/4 |
| 7,702,427 B1 * | 4/2010 | Sridhar et al. .................... | 701/4 |
| 2006/0122820 A1 * | 6/2006 | Wieland et al. ................. | 703/22 |
| 2010/0036651 A1 * | 2/2010 | Joshi ................................. | 703/8 |

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

An airspace complexity reducing system is provided. The airspace complexity reducing system has a data storage device including data describing a multivariable model of an airspace complexity, the airspace complexity being a cumulative effect of factors that influence a system user's ability to manage aircraft in an associated airspace. The airspace complexity reducing system also has a selecting module configured to select a variable from a plurality of variables of the multivariable model and determine an amount by which to modify the selected variable to achieve a predetermined airspace complexity value. In addition, the airspace complexity reducing system has a suggestion module configured to determine a modification to the airspace that results in the determined variable modification and transmit the determined course of action to the system user.

20 Claims, 5 Drawing Sheets

AIR TRAFFIC COMPLEXITY REDUCTION SYSTEM UTILIZING MULTIVARIABLE MODELS

This nonprovisional application claims the benefit of U.S. Provisional Application No. 61/193,112, entitled "Air Traffic Complexity Reduction Framework" filed Oct. 29, 2008, which is hereby incorporated by reference in its entirety.

BACKGROUND

The rapid increase in demand for air transportation has resulted in a serious overload in the National Airspace System (NAS), impacting everyone involved. Passengers experience flight delays and cancellations more often, while airlines find themselves consuming more fuel as flights are placed in holding patterns more frequently. In addition, the problem is predicted to worsen. Studies show that within the next two decades, the demand for air transportation will double, if not triple. Unfortunately, the current capacity of the present airspace system cannot handle demand of that magnitude.

In the current system, the national airspace is divided into sectors, which are monitored by one or more air traffic controllers. Each sector has a certain capacity in terms of number of flights that can be handled in a given interval of time. Sector capacity is directly affected by a sector's complexity, which is the cumulative effect of all factors that influence an air traffic controller's ability to manage air traffic in a sector. Thus, an overloaded sector is the direct effect of a sector that is too complex. Accordingly, resolving the overloading of the sector involves decreasing the complexity.

In current day practice, the complexity of a sector is represented by a single variable, which is the number of aircraft in the sector. Currently, sectors are determined to be too complex (i.e., over capacity) if the aircraft count exceeds a predetermined threshold called the sector monitor alert parameter (MAP). When a sector is too complex, reducing the complexity warrants decreasing the aircraft count by rerouting or delaying the aircraft.

The notion of sector complexity is important even when part of a sector is unusable (due to convective weather or other operational reasons) and has been the focus of several studies, all of which have concluded that complexity involves more variables (metrics) than just the number of aircraft in a sector. To adequately represent such variables, more sophisticated methods of assessment are needed. Further studies have yielded linear regression models and neural networks for predicting sector complexity. Accordingly, these multivariable models can be utilized to reduce sector complexity without reducing the number of aircraft in the sector, thereby increasing sector capacity. However, despite the plethora of studies directed toward reducing the complexity of a sector, none of the studies have utilized the multivariable models.

SUMMARY

In a first embodiment, an airspace complexity reducing system can have a data storage device including data describing a multivariable model of an airspace complexity, the airspace complexity being a cumulative effect of factors that influence a system user's ability to manage aircraft in an associated airspace. The system can also have a selecting module configured to select a variable from a plurality of variables of the multivariable model and determine an amount by which to modify the selected variable to achieve a predetermined airspace complexity value. The system can further have a suggestion module configured to determine a modification to the airspace that results in the determined variable modification and transmit the determined course of action to the system user.

In a second embodiment, a method for reducing an airspace complexity can include developing a multivariable model of the airspace complexity, the airspace complexity being a cumulative effect of factors that influence a system user's ability to manage aircraft in an associated airspace. The method can also include selecting a variable from a plurality of variables of the multivariable model and determining an amount by which to modify the selected variable to achieve a predetermined airspace complexity. The method can further include determining a modification to the airspace that results in the determined variable modification and transmitting the determined course of action to the system user.

In a third embodiment, an airspace complexity reducing system can have a user input device for interfacing with a user and a data storage device including data describing a multivariable model of an airspace complexity, the airspace complexity being a cumulative effect of factors that influence a system user's ability to manage aircraft in an associated airspace. The system can also have a selecting module configured to select a variable from a plurality of variables of the multivariable model and determine an amount by which to modify the selected variable to achieve a predetermined airspace complexity value, the amount by which to modify being based on the number of aircraft in the airspace that exceeds a threshold number of aircraft. The airspace complexity model can further have a suggestion module configured to determine multiple modifications to the airspace and transmit the determined modifications to the airspace to the system user, wherein each of the determined modifications to the airspace results in the same determined variable modification.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
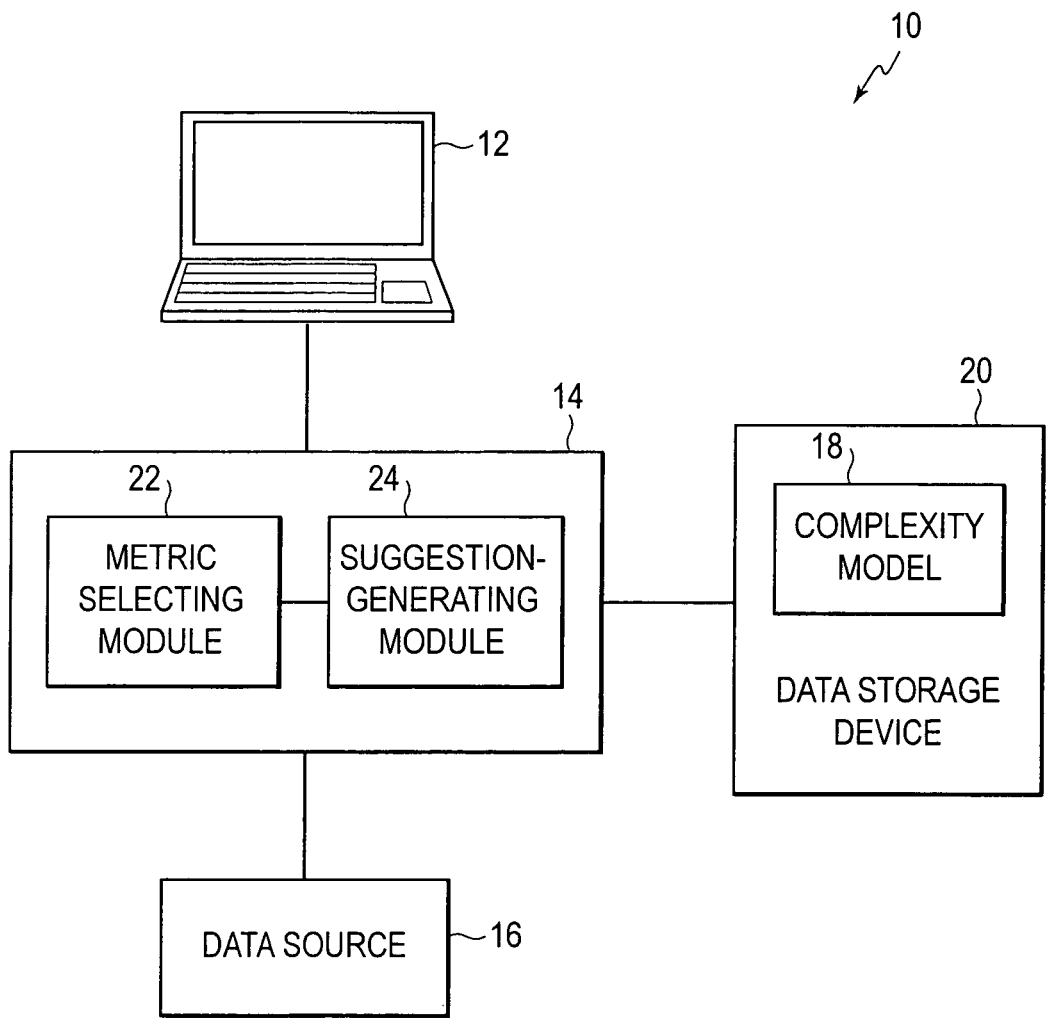
FIG. 1 illustrates an exemplary embodiment of the complexity reduction system.

FIG. 1 illustrates an exemplary system 10 for reducing air traffic complexity for a sector of airspace. The system 10 may generate and offer suggestions to a user for reducing the sector's complexity. The complexity reducing suggestions may be based on the current conditions of the selected sector and may offer alternatives to merely reducing the number of aircraft in the selected sector. The system 10 may include a user interface device 12 and a processor 14. The user interface device 12 may receive input from and output data to a user. In addition, the user interface device 12 may be any device capable of inputting and outputting data and interfacing with a user such as, for example, a terminal device.

The processor 14 may determine an action for reducing the complexity of the airspace sector based on user input received from the user input device 12, sector data received from a data source 16 and a complexity model 18 stored in a data storage device 20. The processor 14 may also include a metric selecting module 22 for selecting a metric to be modified and a suggestion-generating module 24 for generating suggested actions for reducing the complexity of the sector. In addition to the complexity model 18, the data storage device 18 may include a computer readable program code executable by the processor 14 for operating the metric selecting module 22 and the suggestion-generating module 24 to generate a suggested course of action for the user.

The data source 16 may be a database or any other device capable of collecting sector data from one or more sources. The sector data may include but is not limited to, for example, the number of aircraft in the sector, the aircraft density (ratio of number of aircraft to volume of the sector), the sector volume, the number of climbing aircraft, and the variance of all aircraft headings in a sector. In addition, the sector data collected by the data source 16 may correspond to the metrics utilized by the complexity model 18 for simulating the complexity of the sector. Furthermore, the simulation of the sector complexity may include a simulation of an air traffic system usable to generate and validate the complexity model 18.

The complexity model 18 may be any type of mathematical system capable of modeling the complexity of a sector of airspace such as, for example, a preexisting linear regression model, a preexisting neural network, a hybrid of a linear regression model and a preexisting neural network, a user-built model, or any other available mathematical tool capable of simulating the complexity of the airspace sector. It is contemplated that more than one complexity model 18 may be stored in the data storage device 20, if desired. Each complexity model 18 may utilize different metrics and may assume different relationships between those metrics. In addition, each complexity models 18 may have a different scope. For example, one complexity model 18 may apply to a plurality of sectors, while another complexity model 18 may apply to a single sector. Thus, the different complexity models 18 may generate different results when applied to the system 10. Accordingly, storing multiple complexity models 18 in the data storage device 20 may increase the flexibility of the system 10.

The calculations performed by the metric selecting module 22 and the suggestion-generating module 24 may be based on the premise that the complexity of an airspace sector may be the collective effect of all the metrics utilized by the complexity model 18. Accordingly, the complexity of the sector may be defined by the following Eq. 1:

$$DD = c_1 * x_1 + c_2 * x_2 + c_3 * x_3 + \ldots + c_n * x_n = \Sigma c_i * x_i \quad (1)$$

where DD may be the complexity of the sector (dynamic density), $x_i$ may be an actual value of the metric, and $c_i$ may be a weighted coefficient of the associated metric. Thus, the effect a metric may have on the complexity of the sector may be based on the product of the metric value and the associated weighted coefficient. The values of the metrics and the weighted coefficient for a given sector complexity may be determined by the complexity model 18. It should be understood that although the exemplary complexity model 18 represented by Eq. 1 may be a linear regression model, any of the complexity models 18 stored in the data storage device 20 may be a non-linear model.

To initiate the complexity reducing process, the metric selecting module 22 may select one of the metrics defined by the complexity model 18. This selection may be based on the relationships between the metrics defined by the complexity model 18 and the amount by which the complexity of the sector is to be reduced. Such metrics defined by the complexity model 18 may include, for example, the number of aircraft in the sector (AC), the ratio of aircraft in the sector to the sector volume (AD), the sector volume (SV), the number of climbing aircraft in the sector (CA), the variance of all aircraft headings in the sector (HDGVARI), the squared difference between the heading of each aircraft in the sector and the direction of the major axis of the sector weighted by the sector aspect ratio (WASP), and any other metric utilized by the complexity model 18. It should be understood that the above list of metrics is not exclusive.

When selecting a metric to modify, the metric selecting module 22 may first narrow a pool of metrics by eliminating any metric that should not under any circumstance be selected to decrease complexity. Such metrics may be referred to as hard system constraints. Among the hard system constraints may be those metrics whose correlation with the complexity model 18 is not consistent with the user's expectations. For example, in a particular complexity model 18, the number of aircraft within a threshold distance of the sector boundary (WBPROX) may have a negative correlation with complexity. However, because WBPROX may be defined as the number of aircraft within a threshold distance of the sector boundary, the user would likely expect that WBPROX would have a positive correlation with sector complexity. Because this metric may run counter to the user's expectation, it may be referred to as an unintuitive metric.

Unintuitive metrics may exist when the complexity model 18 is unable to capture dependencies between metrics. Accordingly, modifying an unintuitive metric may affect other metrics in unexpected ways and may produce unpredictable results. However, it should be understood that although unintuitive metrics may never be selected by the metric selecting module 22, the metric selecting module 22 may not ignore the unintuitive metrics altogether. This is because the unintuitive metrics may still contribute to the sector complexity and may depend on other metrics, which may be altered. In addition, because unintuitive metrics exist due to a complexity model's inability to adequately describe a relationship between metrics, improving the complexity model 18 or selecting a better complexity model 18 may decrease the number of unintuitive metrics.

Other hard system constraints that may be eliminated from the pool of metrics may be those metrics that cannot yield the target amount of reduction in complexity. For example, a metric may be considered a hard system constraint if its value cannot achieve the desired reduction without exceeding its range. The range of a metric may be defined as the interval of values that the metric may assume without violating user input constraints or a static range of the metric. In one exemplary embodiment, the value for AD (aircraft density) may be a ratio that must be between 0 and 1. If the value for AD must fall outside of this range to achieve the desired reduction in complexity, the AD cannot be selected by the metric selecting module 22. Such values that fall outside of the range may indicate that the user will need to make changes that are more drastic than the user prefers.

The metric selection module 22 may consider additional criteria for identifying metrics as hard system constraints. For example, a metric may also be considered a hard system constraint if its value does not exceed its range but falls within a predetermined value of the end of its range. In one exemplary embodiment, it may be desired that a metric be deemed a hard system constraint if its value falls within 0.1 of the upper limit of its range. Thus, if the value of AD is 0.996 for a desired reduction in complexity, it may still be eliminated from consideration because its value may be within 0.1 of its upper range limit even though 0.996 may fall between the range of 0 and 1.

The metrics remaining after the hard system constraints are eliminated may be referred to as soft system constraints. One of these soft system constraints may be selected by the metric selecting module 22 to reduce the complexity of the sector. In addition, the selection of a soft system constraint may be based on any number of factors. For example, the metric selecting module 22 may select the metric having the largest weighted coefficient ($c_i$). However, the metric ranges may convolute this criterion. In particular, metrics taking on high values may have lower weights. Alternatively, the metric selecting module 22 may select a metric with the greatest statistical significance or the metric with the highest weighted contribution to the sector complexity ($c_i x_i$).

Another approach for selecting a soft system constraint may involve determining the metric having the smallest effect on the current state of the sector while still reducing the sector complexity to the desired level. A metric qualifying under this approach may be the metric having a value farthest away from the end of its range after the proposed change. "Farthest away" may be measured as the distance from the end of the range, normalized by the size of the interval. The metric selecting module 22 may determine the metric farthest away from the end of its range by performing either of the following Eqs. 2 and 3:

$$n = \frac{[(x_i - \Delta_i) - a_i]}{(b_i - a_i)} \quad (2)$$

$$n = \frac{[b_i - (x_i + \Delta_i)]}{(b_i - a_i)} \quad (3)$$

where n may be the normalized "farthest away" value, $x_i$ may be the metric value before the sector complexity is reduced, $\Delta_i$ may be the amount by which the metric value is changed, $a_i$ may be the lower limit of the metric range, and $b_i$ may be the upper limit of the metric range. It should be understood that Eq. 2 may be used with metrics having a positive correlation with the sector complexity, and Eq. 3 may be used with metrics having a negative correlation with the sector complexity. For example, after a proposed decrease, a metric p may be 0.1 away from 0 and may have a range of [0,1]. In addition, a metric q may be 10 away from the lower limit of its range, but may have a much larger range [10,2000]. If both metrics have a positive correlation with the sector complexity, the "farthest away" value of the metric p would be 0.1, while the "farthest away" value of the metric q would be 0.005. Thus, the metric q would be farther away from the end of its range (2000) than the end of the metric p range (1).

After a metric is selected, the metric selecting module 22 may determine the amount by which to modify the selected metric to achieve the desired complexity. This determination may be based on a modified version of Eq. 1, which may be the following Eq. 4:

$$DD = c_d * d + c_j * x_j + K \quad (4)$$

where DD may be the complexity of the sector, d may be the demand on the sector (number of aircraft in the sector), $c_d$ may be the weighted coefficient of the demand according to the complexity model 18, $x_j$ may be the value of the selected metric, $c_j$ may be the weighted coefficient of the metric, and K may be the contribution of the unselected metrics. It should be understood that K may be constant because only the selected metric may be modified.

Typically, the complexity reduction for the sector may become a concern when the sector demand (i.e., number of aircraft in the sector) exceeds a threshold. As previously discussed, sectors may be considered overly complex when the demand on the sector exceeds the threshold. Thus, reducing the demand may reduce the complexity of the sector to a desired level. However, Eq. 4 may permit the complexity of the sector to be reduced without having to reduce the demand on the sector. In particular, Eq. 4 may be used to determine how much $x_j$ (the value of the selected metric) may be decreased to compensate for the amount of the complexity decrease that would have resulted from reducing the demand to the threshold level. The underlying assumption of this concept may be that all else remaining constant, had the sector not been over capacity, the sector would not have been overly complex. This idea may reduce to solving for $\Delta_j$ (the amount by which $x_j$ should be decreased) in the following Eq. 5:

$$c_d \Delta_d = c_j \Delta_j \quad (5)$$

where $\Delta_d$ may be the difference between the demand and the threshold, $c_d$ may be the weighted coefficient of the demand according to the complexity model 18, $\Delta_j$ may be the amount by which the metric should be decreased, and $c_j$ may be the weighted coefficient of the selected metric. Thus, the weighted effect of the amount by which $x_j$ should be decreased on the sector complexity may be equivalent to the weighted effect reducing the demand may have on the sector complexity.

Eqs. 4 and 5 may eliminate the need to reduce demand to achieve the desired sector complexity. This may result in a 100% reduction in flight delays. However, such a dramatic reduction in delays may not be necessary. In particular, the user may wish to reduce the number of delays by (100$\alpha$) percent with a being less than 1. If the user wishes to reduce the number of delays by 100$\alpha$ with a being less than 1, the sector complexity may be decreased by delaying $(1-\alpha)\Delta_d$ flights for a complexity decrease of $(1-\alpha) c_d \Delta_d$ and changing the selected metric j by $\alpha \Delta_d c_d / c_j$ for an additional complexity decrease of $\alpha c_d \Delta_d$.

It should be understood that although metric selecting module 22 may modify one metric to reduce demand, metric selecting module 22 may select multiple metrics to reduce demand. In such an embodiment, Eqs. 4 and 5 may be modified to the following Eqs. 6 and 7:

$$DD = c_d * d + c_i * x_i + c_j * x_j + K \quad (6)$$

$$c_d \Delta_d = c_i \Delta_i + c_j \Delta_j \quad (7)$$

where $x_i$ may be a first selected metric, $x_j$ may be a second selected metric, $c_i$ and $c_j$ may be weighted coefficients of the respective selected metrics, $\Delta_i$ and $\Delta_j$ may be the amount by which the first and second metrics should be decreased, and K may be the cumulative effect of the unselected metrics.

The suggestion-generating module 24 may receive the suggested metric change calculated by the metric selecting module 22 and may generate a suggested course of action for the user that may include one or more modifications to the airspace. Such modifications may include, for example, changing aircraft headings, changing aircraft speeds, changing aircraft altitudes, or any other modification that may change the current state of the airspace. In some circumstances, the suggestion-generating module 24 may also utilize flight information from individual airplanes within the sector to generate a suggested course of action. The flight information may include, for example, heading, position, and speed. In addition, the suggested course of action may depend heavily on the metric set utilized by the complexity model 18. Thus, the suggestion-generating module 24 may generate different courses of action for different metric sets.

Suggested courses of action generated by the suggestion-generating module 24 may range from being general (e.g., decrease aircraft density by 0.2) to very specific (e.g., increase/decrease the speed of flight F by X knots). The more general suggestions may benefit the user by giving the user the flexibility to achieve the change in whatever way the user may deem most appropriate. On the other hand, the general suggestions may not be adequate if the user does not know how to achieve the change. Therefore, the suggested courses of action generated by the suggestion-generating module 24 may include varying degrees of specificity. One example of such a generated suggestion may be the statement "It is suggested that you [general suggestion]. One way of doing this might be to [specific suggestion]." Providing the user varying degrees of specificity may grant the user enough context to make a better decision.

In one exemplary embodiment, the complexity model 18 may utilize a metric set including aircraft count (AC), aircraft density (AD1), sector volume (SV), and angle of convergence (WCONVANG). The suggestion-generating module 24 may generate different suggested courses of action for each metric depending on which metric is selected by the metric selecting module 22. In addition, the suggestion-generating module 24 may not generate a suggested course of action for metrics that may be beyond the authority of a regional traffic flow management team having jurisdiction over the airspace sector. For example, the suggestion-generating module 24 may not generate a suggested course of action if the sector volume metric is selected by the metric selecting module 22 because changing the volume of a sector may be outside the authority of the regional traffic flow management team.

The suggested course of action generated by the suggestion-generating module 24 for the aircraft count and NUMHORIZ metrics may not be very specific because these metrics may be counting metrics. In other words, the calculations a user may need to reduce these metrics, may be simply counting aircraft. For example, if either metric is selected by the metric selecting module 22 to be decreased by 4, simply reducing the number of flights by 4 so that they may not be counted in the metric of interest may achieve the desired goal. The suggested course of action may be more specific if desired, but a more specific suggestion may require individual flight information such as, for example, position, heading, and speed).

In an exemplary embodiment, the metric selecting module 22 may determine that the aircraft density of the sector should be reduced by a factor of 0.1 to achieve the desired reduction in complexity. Because reducing the demand may be considered a last resort, a better solution may be to increase the occupied volume of the sector. Therefore, it may be desired to increase the occupied volume of the sector by an additive factor of (old volume)/0.9. This general suggestion may be provided to the user, but more specific instructions regarding which flights to change may be more useful.

Figure 2:
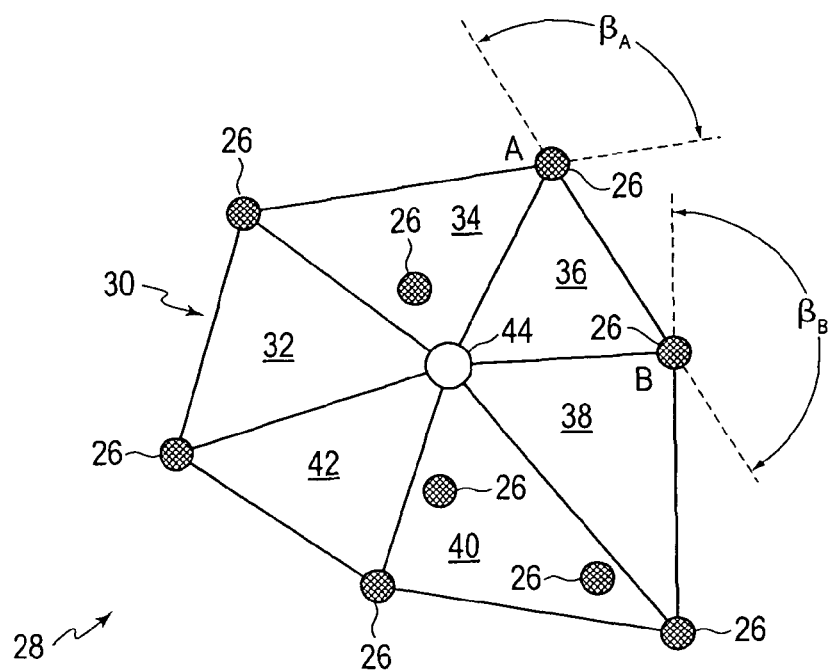
FIG. 2 illustrates an exemplary airspace sector.

As can be seen in FIG. 2, a plurality of aircraft 26 may be located inside a sector 28. The sector 28 may include a convex bounding polygon 30 divided into triangles 32-42. A centroid 44 of the sector 28 may serve as a vertex for each of the triangles 32-42. In addition, the other two vertices of each triangle 32-42 may be located at adjacent aircraft 26. The total occupied volume of the sector 28 may be the sum of the volumes of the triangle 32-42, where a triangle's volume may be the lateral area covered multiplied by the maximum altitude difference between the aircraft 26 in that triangle.

Figure 3:
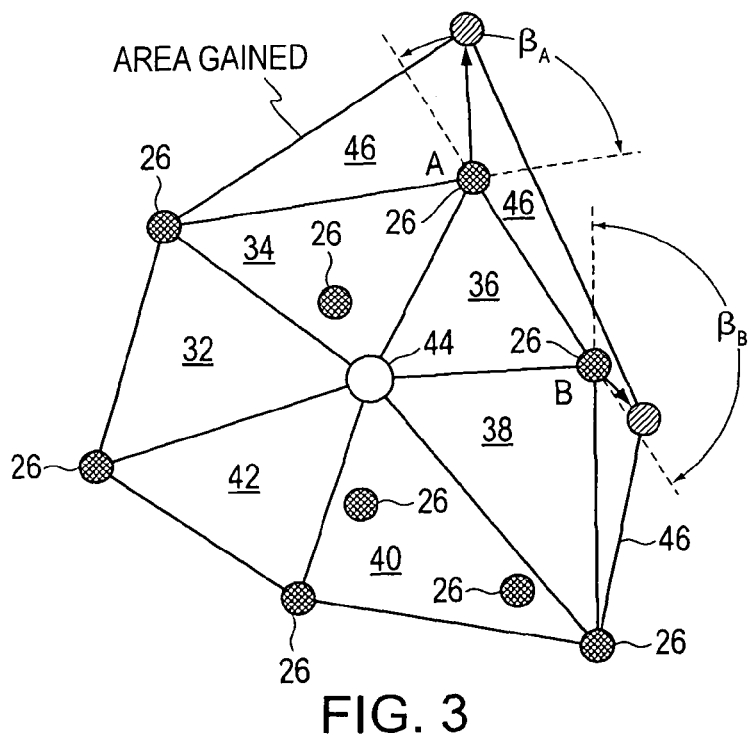
FIG. 3 illustrates the airspace sector of FIG. 2.

As can be seen in FIG. 3, any aircraft 26 located at a vertex of one of the triangles 32-42 whose headings may be within specified angles $\beta_A$ or $\beta_B$ away from the centroid 44 may increase the total occupied volume of the sector 28 by an added area 46. In addition, the shifted triangle boundaries may not cause a change in any altitude differences. Accordingly, the suggestion-generating module 24 may generate a general suggestion directing the user to adjust the aircraft 26 that may have headings within the angles $\beta_A$ or $\beta_B$. The suggestion-generating module 24 may further generate more specific suggestions that may include speeding up aircraft 26 whose headings are in either angle $\beta_A$ or $\beta_B$, proportional to how close the aircraft's heading is to "directly away" from the centroid 44. Additional instructions may include slowing down aircraft 26 whose headings are not within either angle $\beta_A$ or $\beta_B$ proportional to how close the aircraft's heading is to "directly away" from the centroid 44. The suggestion-generating module 24 may further suggest making sure that the internal aircraft 26 holding their altitudes remain within their respective triangles. In addition, the suggestion-generating module 24 may recommend increasing the altitude differences between the aircraft 26. It should be understood that if positions and headings of the aircraft 26 are not available, the suggestion-generating module 24 may only be able to make a general suggestion to speed up aircraft 26 heading away from the centroid 44 and slow down those aircraft 26 heading toward the centroid 44.

In another exemplary embodiment, the metric selecting module 22 may determine that the WCONVANG metric should be reduced. If the flight positions and headings of the aircraft in the sector are not available to the suggestion-generating module 24, the suggestion-generating module 24 may generate two general level recommendations. These recommendations may involve increasing the number of flight pairs that may be laterally at least 13 nautical miles apart and increasing the heading difference of pairs of aircraft that may be less than 13 nautical miles apart.

Figure 4:
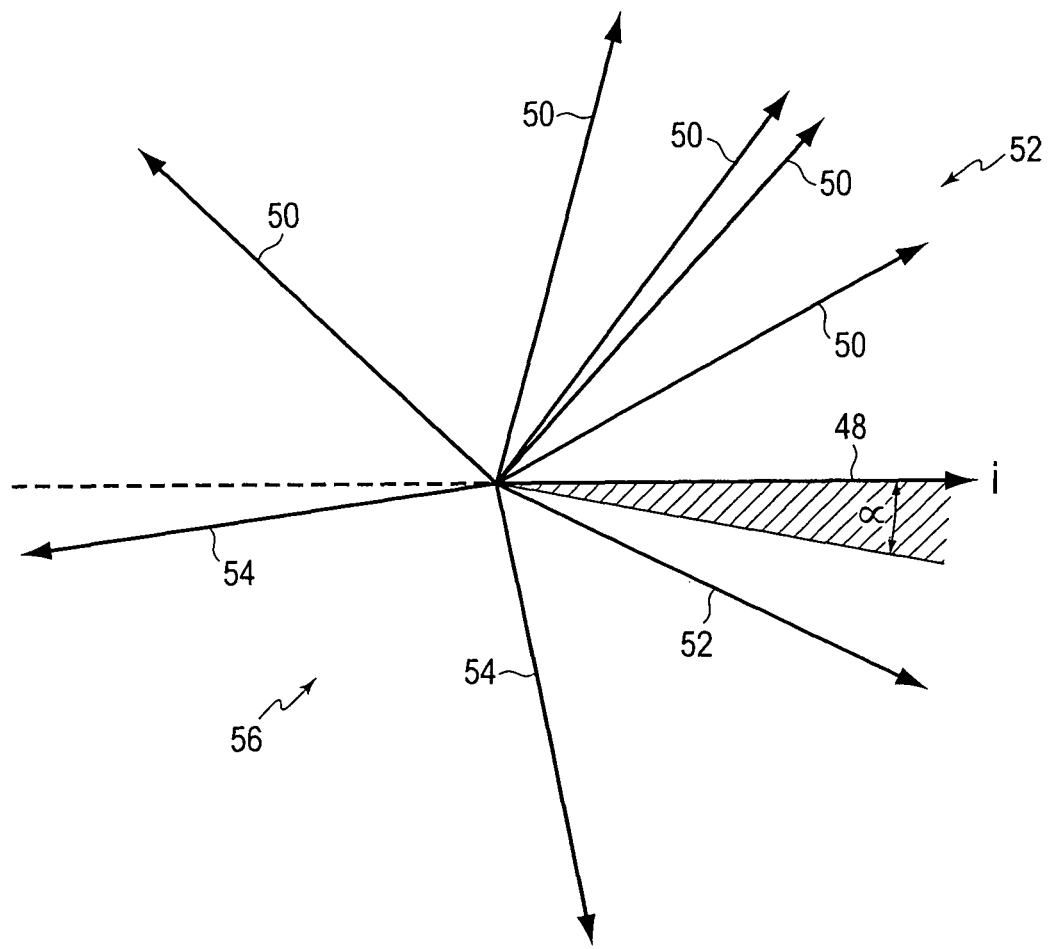
FIG. 4 illustrates a plurality of aircraft headings of aircraft within an exemplary sector of airspace.

If the flight positions and headings of the aircraft in the sector are available to the suggestion-generating module 24, the generated suggestions may be more specific. For example, the specific recommendation may instruct the user to identify a first aircraft whose heading may be changed by at most $\alpha$ degrees. After identifying the first aircraft, the user may be instructed to identify additional aircraft that may be within 13 nautical miles of the first aircraft. As is illustrated in FIG. 4, the first aircraft may have a heading 48. In addition, some of the aircraft within 13 nautical miles of the first aircraft may have headings 50 in one general direction relative to the heading 48. The headings 50 may be part of a first heading group 52. The rest of the aircraft within 13 nautical miles of the first identified aircraft may have headings 54 in a second general direction relative to the heading 48 and may be part of a second group 56. The user may then be directed to change the heading 48 by a degrees in the direction of the smaller of the first group 52 and the second group 56. In exemplary embodiment of FIG. 4, the second group 56 may have three headings, while the first group 52 may have five headings. Thus, the heading 48 may be changed by a degrees in the direction of the second group 56. If the WCONVANG metric does not reduce the sector complexity with this action, another aircraft outside of this group may be identified, and the process may be repeated. It should be understood that once an aircraft is identified for a heading change or is one of the aircraft within 13 nautical miles of an aircraft whose heading is changed, the aircraft's heading may not be changed.

Figure 5:
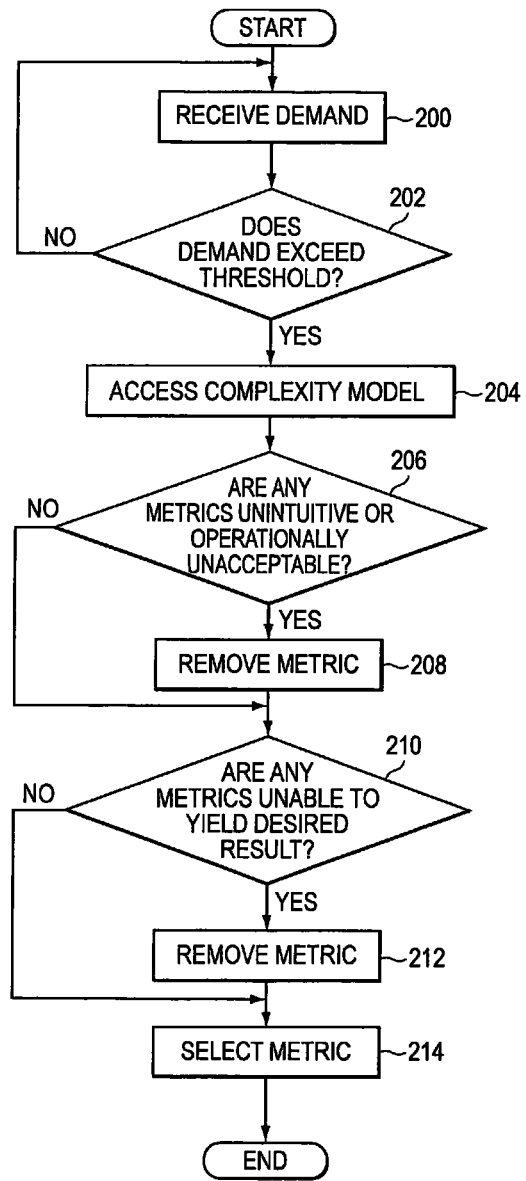
FIG. 5 is a flow chart illustrating an exemplary method for selecting a metric to be modified to reduce the complexity of an exemplary airspace sector.

FIG. 5 illustrates an exemplary method for selecting a metric utilized by the complexity model 18. The method may begin at step 200 by receiving the demand imposed on an airspace sector. The demand may be the number of aircraft currently within the sector. In addition, the processor 14 may receive the demand from any source. For example, the user may manually determine the demand on the sector by counting the number of aircraft within the sector. The user may then manually enter the demand through the user input device 12, which may transmit the demand to the processor 14. In another method, each aircraft entering and exiting the airspace sector may trigger an automatic counting device (not shown) that may provide the demand to the data source 16, which may in turn output the sector demand to the processor 14.

After receiving the sector demand, the metric selecting module 22 may compare the sector demand to a threshold (step 202). The threshold may be a level of demand beyond which, the sector may become too complex for the air traffic controllers monitoring the sector. The threshold may be stored in the data storage device 20 or may be input by the user through the user input device 12. If the demand does not exceed the threshold (step 202: No), step 200 may be repeated (i.e., the demand on the airspace sector may be received by the processor 14).

If the demand exceeds the threshold (step 202: Yes), the processor 14 may access the complexity model 18 stored on the data storage device 20 (step 204). The complexity model 18 may provide a list of metrics used for modeling the complexity of the airspace sector. The complexity model 18 may also prescribe relationships between the metrics. If more than one complexity model 18 is stored on the data storage device 20, the user may manually select which complexity model 18 to use via the user interface device 12. Alternatively, the processor 14 may automatically select the complexity model 18 based on any number of criteria such as, for example, the complexity model 18 most often used or the complexity model 18 most recently used.

Next, in step 206, the metric selecting module 22 may determine if any metrics utilized by the complexity model 18 are unintuitive or operationally unacceptable. The metrics of the complexity model 18 may be unintuitive if the metric's correlation with sector complexity runs counter to the user's expectation. For example, the user may expect a metric A to have a positive correlation with complexity. However, as utilized by the complexity model 18, metric A may actually have a negative correlation with the complexity of the sector. Therefore, metric A may be deemed as unintuitive. The metric selecting module 22 may determine whether a metric is unintuitive using any number of methods. For example, the metric selecting module 22 may reference a predetermined list of metrics previously identified as unintuitive. Alternatively, the metric selecting module 22 may present each metric to the user and ask the user whether the metric has a positive or negative correlation to complexity. Any metrics in which the user's expectation conflicts with the complexity model 18 may be deemed as unintuitive.

A metric may be operationally unacceptable based on past input from a user. For example, a user may not accept a suggested modification to the sector if the change is too small. Accordingly, if a sector change resulting from a metric modification falls below a predetermined threshold, the metric may be determined to be operationally unacceptable. In another example, a modification to a particular metric may cause the complexity of adjacent sectors to increase by an undesired amount. Accordingly, such a metric may also be determined to be operationally unacceptable.

If any metrics are determined to be unintuitive or operationally unacceptable (step 206: Yes), the metric selecting module 22 may remove such metrics from a list of metrics that may potentially be modified (step 208). If no metrics are determined to be unintuitive or operationally unacceptable (step 206: No) or after performing step 208, the metric selecting module 22 may determine whether a metric can yield the desired reduction in sector complexity without being forced out of its range (step 210).

Each metric may have a range of acceptable values. Such values may be based on user input or may be predetermined. For example, if a metric B were a ratio, it would have a range of acceptable values from 0 to 1. If a desired reduction in complexity would force the metric B outside of this range, the metric B would not be able to yield the desired reduction. To determine whether a desired reduction may force a metric outside of its desired range, metric selecting module 22 may use the following Eq. 8:

$$\Delta_i = \frac{c_d(\text{demand} - \text{threshold})}{c_i} \quad (8)$$

where $\Delta_i$ is the change in the metric value needed to achieve the desired complexity reduction, $c_d$ is the weighted coefficient of the "demand-threshold" value assigned by the complexity model 18, and $c_i$ is the weighted coefficient of the metric being analyzed, which may be assigned by the complexity model 18. If $x_i - \Delta_i$ (where $x_i$ is the current value of the metric) falls outside of the metric's range of acceptable values, the metric selecting module 22 may remove such metrics from a list of metrics that may potentially be modified.

If the metric selecting module 22 determines that any of the metrics cannot yield the desired complexity reduction (step 210: Yes), the metric selecting module 22 may remove such metrics from a list of metrics that may potentially be modified (step 212). If all metrics are able to yield the desired complexity reduction (step 210: No) or after performing step 212, the metric selecting module 22 may select a remaining metric to be modified (step 214).

The metric selecting module 22 may select one of the remaining metrics using any one of a number of approaches. For example, the metric selecting module 22 may select the remaining metric having the largest weighted coefficient ($c_i$). In another approach, the metric selecting module 22 may select a metric with the greatest statistical significance or the metric with the highest weighted contribution to the sector complexity ($c_i x_i$). In yet another approach, the metric selecting module 22 may determine the metric having the smallest effect on the current state of the sector while still reducing the sector complexity to the desired level (i.e., the metric "farthest away" from the end of its normalized range).

Figure 6:
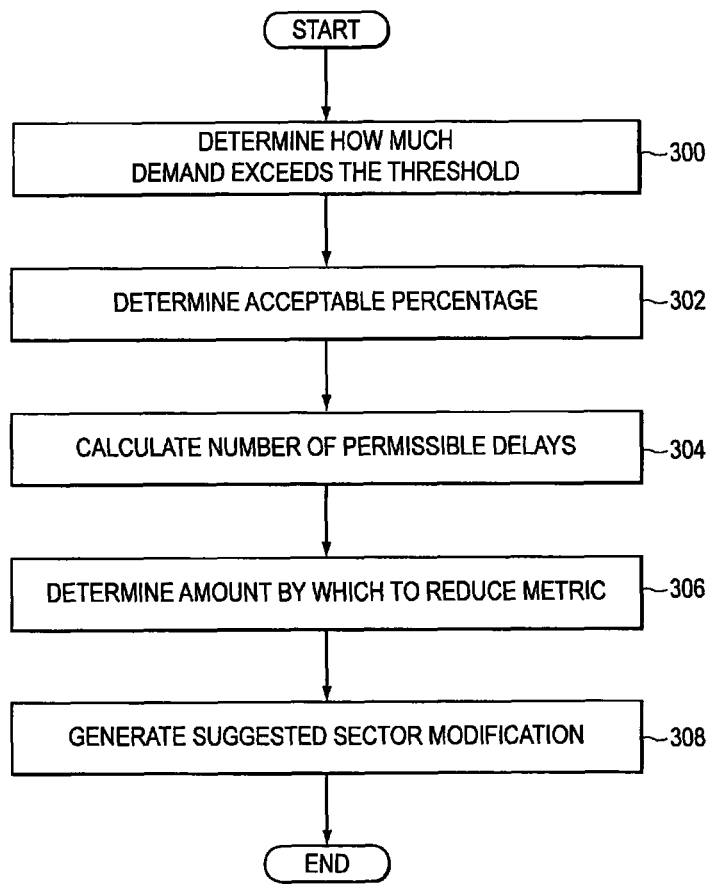
FIG. 6 is a flow chart illustrating an exemplary method for determining an amount by which to modify the metric selected by the exemplary method of FIG. 5.

After the metric selecting module 22 selects a metric for modification, the exemplary method illustrated in FIG. 6 may be performed. The method may begin at step 300 by determining an amount by which to reduce the demand on the sector. This may be done by calculating the difference between the demand (number of aircraft in the sector) and the threshold (maximum desired number of aircraft in the sector).

Next, step 302 may be performed by determining an acceptable amount of delays or time based metering solution that may be implemented to achieve the desired complexity reduction. When reducing the complexity of a sector of airspace, it may be desired to do so without delaying any of the flights in the sector. However, the user may be willing to accept some delays to achieve the desired reduction. Accordingly, the user may input an acceptable percentage of the flights that may be delayed through the user input device 12.

Next step 304 may be performed by determining the number of flights to delay to achieve the desired complexity reduction. To determine the number of flights to delay, the number of flights that exceed the threshold may be multiplied by the acceptable percentage received in step 302. The resulting product may be the number of flights that may be delayed. If the resulting product is not a whole number, the product may be rounded down to the next whole number. For example, if the threshold for a sector is exceeded by four flights and the user inputs 40% as an acceptable percentage of flights to be delayed, 1.6 flights may be delayed to reduce the complexity of the sector. However, because 1.6 is not a whole number, the number of flights may be rounded down to the next lower whole number, which is 1. Accordingly, one flight out of the four excess flights may be delayed to reduce the complexity of the sector.

After the number of acceptable delays is determined, the metric selecting module 22 may determine the amount by which to reduce the selected metric (step 306). To determine the amount by which to reduce the selected metric, the metric selecting module 22 may multiply the difference between the demand and the threshold by a weighted factor assigned by the complexity model 18. The resulting product may be divided by a weighted factor assigned to the selected metric by the complexity model 18. Once this value is determined, it may be multiplied by one minus the percentage of the acceptable delays. The combined values determined from steps 304 and 306 may produce the desired reduction in sector complexity.

In step 308, the suggestion-generating module 24 may provide the user with one or more suggestions on how to achieve the desired goal. Each suggestion may be generated by accessing an algorithm specifically designed for the selected metric. For example, if the selected metric relates to the occupied density of the sector, the suggestion-generating module 24 may access an algorithm for adjusting the geometry of the sector by increasing and decreasing the speed of aircraft within the sector.

The one or more suggestions may range from the general to the very specific. For example, the suggestion-generating module 24 may provide the suggestion "It is suggested that you [general suggestion]. One way of doing this might be to [specific suggestion]." General suggestions for modifying a sector may be very broad and may allow the user a lot of leeway. For example, a general suggestion may simply state the desired goal of decreasing aircraft density by 0.2. Accordingly, it may be up to the user to determine how to manipulate the aircraft in the sector to achieve the desired goal.

The specificity of the suggested sector modification may be dependent on the metric selected for modification. For example, the algorithms associated with each metric may have different levels of complexity. Thus, a mathematically complex metric may be more computationally expensive than a mathematically simple metric. Accordingly, a suggested sector modification based on the mathematically complex metric may be more general than a suggested sector modification based on the mathematically simple metric.

The specificity of the suggested sector modification may also depend on the information available to the system 10. For example, a suggested sector modification may be to modify the heading of a specific aircraft to a specific direction. However, if the heading of the aircraft or the identification of the aircraft is unknown, the suggested sector modification may be more general. For example, without the identification of an aircraft or its heading, the suggested sector modification may be to modify the heading of any aircraft at a certain location to be within a certain range.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An airspace complexity reducing system, comprising:
a data storage device including data describing a multivariable model of an airspace complexity, a plurality of variables of the multivariable model including at least variances of all aircraft headings in the airspace, the airspace complexity being a cumulative effect of factors that influence a system user's ability to manage aircraft in the airspace, the airspace complexity being defined as a dynamic density (DD) expressed as DD $=\Sigma_{i=1}^{n}(c_i * x_i)$ where $x_i$ is a value of the variables of the multivariable model and $c_i$ is a weighted coefficient associated with the value;
a selecting module configured to select a variable from the plurality of variables of the multi variable model and determine an amount by which to modify the selected variable to achieve a predetermined airspace complexity value for reading the airspace complexity; and
a suggestion module configured to a course of action to the system user depending on the selected variable.

2. The system of claim 1, wherein the selecting module is further configured to identify variables of the multivariable model that cannot achieve the predetermined airspace complexity value.

3. The system of claim 2, wherein the selecting module cannot select the identified variables of the multivariable model that cannot achieve the predetermined airspace complexity.

4. The system of claim 3, wherein the suggestion module is further configured to generate multiple modifications to the airspace with each modification to the airspace achieving the same determined variable modification.

5. The system of claim 4, wherein the amount by which the selected variable is modified is based on a difference between a number of aircraft in the airspace and a threshold number of aircraft.

6. The system of claim 5, wherein the variables of the multivariable model that cannot achieve the predetermined airspace complexity value include the variables of the multivariable model that are forced outside of an acceptable range when the predetermined airspace complexity value is achieved.

7. The system of claim 5, wherein, the variables of the multivariable model that cannot achieve the predetermined airspace complexity value include the variables of the multivariable model whose correlation with the airspace complexity runs counter to an expectation of the system user.

8. The system of claim 5, wherein the selecting module is further configured to select a variable from the plurality of variables of the multivariable model based on an assigned variable weight.

9. A method for reducing an airspace complexity using a processor, the method comprising:
 developing a multivariable model of the airspace complexity, a plurality of variables of the multivariable model including at least variances of all aircraft headings in the airspace, the airspace complexity being a cumulative effect of factors that influence a system user's ability to manage aircraft in the airspace, the airspace complexity being defined as a dynamic density (DD) expressed as $DD=\Sigma_{i=1}^{n}(c_i * x_i)$ where $x_i$ is a value of the variables of the multivariable model and $c_i$ is a weighted coefficient associated with the value;
 reducing the air space complexity by selecting a variable from the plurality of variables of the multivariable model;
 determining an amount by which to modify the selected variable to achieve a predetermined airspace complexity; and
 transmitting a course of action to the system user depending on the selected variable.

10. The method of claim 9, further including identifying variables of the multivariable model that cannot achieve the predetermined airspace complexity value.

11. The method of claim 10, further including preventing the selection of the identified variables of the multi variable model that cannot achieve the predetermined airspace complexity value.

12. The method of claim 11, further including generating multiple modifications to the airspace, wherein each modification to the airspace results in the same determined variable modification.

13. The method of claim 12, further including modifying the selected variable based on a difference between a number of aircraft in the airspace and a threshold number of aircraft.

14. The method of claim 12, wherein the variables of the multivariable model that cannot achieve the predetermined airspace complexity value include the variables of the airspace model that are forced outside of an acceptable range when the predetermined airspace complexity value is achieved.

15. The method of claim 12, wherein, the variables of the multivariable model that cannot achieve the predetermined airspace complexity value include the variables of the airspace model whose correlation with the airspace complexity runs counter to an expectation of a system user.

16. The method of claim 12, further including selecting a variable from the plurality of variables of the airspace model based on an assigned variable weight.

17. The method of claim 12, further including selecting a variable from the plurality of variables that has the smallest effect on the current state of the airspace while still achieving the predetermined airspace complexity value.

18. An airspace complexity reducing system, comprising:
 a user input device for interfacing with a system user;
 a data storage device including data describing a multivariable model of an airspace complexity, a plurality of variables of the multivariable model including at least variances of all aircraft headings in the airspace, the airspace complexity being a cumulative effect of factors that influence a system user's ability to manage aircraft in the airspace, the airspace complexity being defined as a dynamic density (DD) expressed as $DD=\Sigma_{i=1}^{n}(c_i * x_i)$ where $x_i$ is a value of the variables of the multivariable model and $c_i$ is a weighted coefficient associated with the value;
 a selecting module configured to select a variable from the plurality of variables of the multivariable model and determine an amount by which to modify the selected variable to achieve a predetermined airspace complexity value for reducing the airspace complexity, the amount by which to modify being based on the number of aircraft in the airspace that exceeds a threshold number of aircraft; and
 a suggestion module configured to determine multiple modifications to the airspace and transmit the determined multiple modifications to the airspace to the system user, wherein each of the determined multiple modifications to the airspace results in the same determined variable modification.

19. The system of claim 18, wherein the amount by which to modify the selected variable is also based on an acceptable number of flight delays for the aircraft in the airspace.

20. The system of claim 19, wherein the selecting module is further configured to identify variables of the multivariable model that cannot achieve the predetermined airspace complexity value.

* * * * *